July 12, 1927.
M. W. MILLER
LABEL FOR LIVESTOCK
Filed Nov. 19, 1925
1,635,853
Fig. 1.
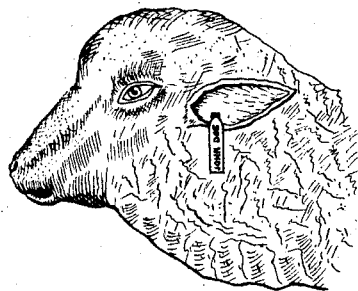
Fig. 2.  Fig. 3.  Fig. 4.
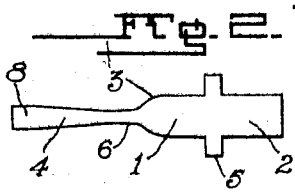 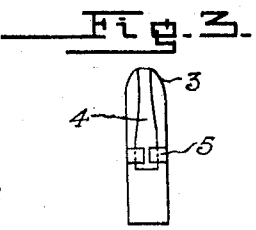 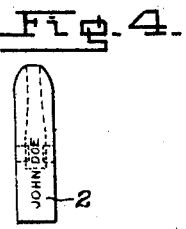
Fig. 5
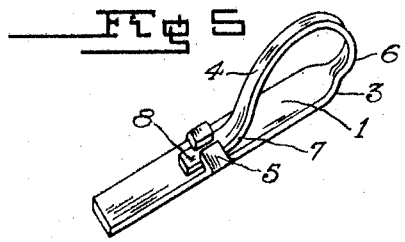
INVENTOR
Minnie W. Miller
BY
*Shreve, Crowe + Gordon*
ATTORNEYS Patented July 12, 1927.

1,635,853

UNITED STATES PATENT OFFICE.

MINNIE W. MILLER, OF SALT LAKE CITY, UTAH.

LABEL FOR LIVESTOCK.

Application filed November 19, 1925. Serial No. 70,133.

This invention relates to metallic labels or marking tags for live stock and more especially to the type which may be attached to the ears of the animal.

The principal object of this invention is to provide an animal marker or identification tag which may be quickly, easily and securely attached in such a manner as to lessen the danger of being accidentally torn from the animal by contact with brush or shrubbery.

A further object of this invention is to provide an identification tag of simple construction that may be easily and cheaply manufactured but at the same time one which is of light weight and durable construction.

Briefly stated the invention consists of an identification tag formed from a single strip of metal bent in a loop which is clamped in a closed position by securing tongues projecting from the sides of the strip.

A more detailed description of the construction, novel combination and arrangement of parts are to be hereinafter fully described, illustrated in the accompanying drawings and pointed out in the claims hereto appended, it being understood that various changes in form, proportion and minor details of construction may be resorted to without departing from the spirit or sacrificing any of the advantages of this invention.

Referring more particularly to the accompanying drawings in which corresponding parts are indicated by similar reference characters:

Fig. 1 is a general view illustrating the application of tag to the ear of an animal.

Fig. 2 is a plan view showing the tag in open position as the stamping comes from the dies.

Fig. 3 is a rear elevation showing the tag in looped position and clamped.

Fig. 4 is a front elevation of the tag showing surface on which name of owner or other identification marks are stamped or engraved, and Fig. 5 is a perspective view showing the tag in looped and clamped position as when attached to the animal.

The familiar types of identification tags now in use are attached to the ear of the animal in such a manner that both the means of attachment and the identification plate or label portion, project from the ear to such an extent that they are likely to catch in brush, wire fences or shrubbery.

It is therefore the aim and purpose of this invention to devise a tag which lies close to the ear of the animal, which in applicant's device is accomplished by utilizing the label portion to close one side of the attaching loop, thus bringing the label portion well upon the ear of the animal thereby minimizing the amount of overhanging metal and affording greater safety from entanglement.

In the illustrated embodiment characterizing this invention (1) indicates the body of the identification tag which consists of a single strip of pliable material preferably metal composed of a label or indicia portion (2) which tapers at (3) into a narrower suspension portion (4). At either side of the label portion (2) and about centrally located thereon are two laterally projecting securing tongues (5). The suspension portion (4) is tapered slightly toward the center (6) of the strip where it meets the taper (3) of the label (2). This restricted area at (6) facilitates bending the strip to form the loop.

To form the complete tag the body (1) is bent upon itself as shown in Fig. 5, the loop being formed in the restricted area (6) beyond the label portion (2) which is left straight. The loop (4) is bent again at (7) in such a manner that its end (8) comes in juxtaposition with rear or unmarked portion of the label (4).

In the operation of the device the loop portion (4) is inserted in the opening which has been punched in the ear of the animal and then pressed down until its extremity touches (8) the rear of the label (2) where it is clamped in position by the securing tongues (5) which are pressed down over the abutting end.

In conclusion it will be noticed from the drawings that the hole punched in the animal's ear may be small and near the edge, since the part of the tag which enters this opening is of very small width and the loop is amply dimensioned to enclose the edge of the ear without undue pressure.

Since the label portion of the tag forms one side of the attaching loop, ample marking surface is provided without having the objectionable feature of a large overhanging or projecting tag.

Having described my invention what I claim as new and wish to secure by Letters Patent is:

1. An animal marker formed from a single strip of pliable material and embodying an indicia and a suspension portion, the width of the latter being considerably less than that of the indicia portion to enable its ready insertion in a comparatively small opening in the ear of the animal to be identified, and means on the indicia portion to securely engage the free end of the suspension portion, said means being so located intermediate the extremities of the indicia portion as to provide a loop, the internal dimensions of which will permit positionment of the marker without undue pressure on the part enclosed.

2. An animal marker formed from a single strip of pliable material and embodying an indicia and a suspension portion, the width of the latter being considerably less than that of the indicia portion to enable its ready insertion in a comparatively small opening in the ear of the animal to be identified, and means on the indicia portion to securely engage the free end of the suspension portion and including oppositely disposed ears adapted to be bent into engagement with and securely fasten the free end of the suspension portion to form a loop thereof, said ears being disposed intermediate the length of the indicia portion to provide a loop of such internal dimensions as to permit positionment of the marker without undue pressure on the part enclosed.

MINNIE W. MILLER.